United States Patent Office 3,085,917
Patented Apr. 16, 1963

3,085,917
CHEMICAL CLEANING METHOD AND MATERIAL
Kenneth C. Netzler and Allyn N. Stillman, Cincinnati, Ohio, assignors to General Electric Company, a corporation of New York
No Drawing. Filed May 27, 1960, Ser. No. 32,126
7 Claims. (Cl. 134—27)

This invention relates to the chemical cleaning of articles, and more particularly, to the chemical removal of products of combustion such as carbon, corrosion products, heat scale and paint.

The complex power producing apparatus currently in use is generally assembled from components which can include such metals as aluminum, magnesium, titanium, various types of steels and the so called "super" alloys of the nickel, cobalt or iron base type. In some cases, a number of such components have been coated such as with paint principally for corrosion or erosion protection. From time to time, such power producing apparatus, for example gas turbines, must be overhauled in order to assure their safe operation over extended periods of time. Part of an overhaul program for such apparatus includes non-destructive testing of the component parts to assure their safe condition for future operation. Prior to such inspection, however, all surface contamination such as paint, heat scale, products of combustion such as carbon or components of fuels, corrosion products such as rust, and the various types of oils, fats and waxes which, along with loose dirt, will be referred to herein as "grease," must be removed so that all portions of the surface of the component parts may be available for inspection.

Prior to this invention, an overhaul operation capable of handling parts made from a wide variety of materials included a large number of different types of solutions as well as relatively expensive or time consuming operations such as mechanical grit blasting using metallic or non-metallic grit, or organic seed products such as rice hulls or walnut shells. Frequently, expensive molten salt baths have been used to clean difficult-to-clean parts particularly of super alloy material.

A principal object of this invention is to provide a universal cleaning method including a small number of liquid chemical baths which do not require special equipment to operate and which are capable of removing paint, products of combustion, products of corrosion and heat scale from a wide variety of types of materials such as aluminum, titanium, magnesium, steels and super alloys.

Another object of this invention is to provide an improved, inexpensive method and solutions for the removal of carbon and heat scale from super alloy articles.

Still a further object is to provide a paint stripping solution particularly useful in removing paint from articles including aluminum along with such other materials as steel and magnesium.

Briefly stated, the present invention in one form comprises, in a method for conditioning metal articles for cleaning, the steps of contacting an article with at least two solutions selected from the group consisting of sequestered inorganic alkaline aqueous solution, alkaline permanganate aqueous solution, and mixed inhibited inorganic acids aqueous solution.

It has been found through the present invention that even the most tenacious, difficult-to-remove carbon and heat scale or metallic components generally assembled in a gas turbine powerplant can be removed by no more than four simple, relatively inexpensive chemical solutions used after preliminary degreasing in any well known manner such as by vapor degreasing. The solutions involved in the universal cleaning method of this invention consists of an inhibited chromic acid aqueous solution, an inorganic alkaline aqueous solution, an alkaline permanganate aqueous solution and inhibited mixed inorganic acids aqueous solution.

Although it is possible to design an automatic system including these four solutions, it has been found most practical to arrange them for batch type operation so that their use will depend upon the condition of the individual article prior to cleaning. In an automatic system it would be necessary to provide maximum immersion time in each of the solutions in order to assure adequate cleaning of the most difficult-to-clean article. Thus an automatic operation could become more costly when time is of the essence.

These four solutions, which will be discussed in detail later, require no special equipment other than the standard ventilating systems and tank linings used commercially with the types of chemicals involved. The only supplementary equipment required to complete the cleaning system includes (1) a degreasing unit such as a vapor degreaser or steam gun to initially remove oil, fats, waxes and loose particles or to remove loose particles after the article has been treated in the last cleaning tank, (2) the usual water rinse tanks to remove the cleaning solutions from the article at the conclusion of immersion in the cleaner tanks and (3) optional agitation means such as mechanical stirrers to flow solution over the part more rapidly. It is contemplated that the tanks can include power spray units to aid in removing material loosened by the chemical bath.

The first solution used in the method of this invention and which is referred to herein as "the sequestered inorganic alkaline aqueous solution" is preferably an aqueous solution made by mixing with water about 4 pounds per gallon of solution of the mix consisting essentially, in percent by weight, of 85–86% sodium hydroxide, 14–15% sodium gluconate and about 0.1% of a suspending agent such as sodium carboxymethylcellulose. Although this aqueous bath can be operated between about 210–250° F., we prefer to operate at about 230° F. The preferred mixed liquid solution thus consists essentially of, in percent by weight, 29–30% sodium hydroxide, 4–5% sodium gluconate, 0.05–0.10% sodium carboxymethylcellulose with the balance water.

The second of the four solutions used in the practice of the method of this invention is referred to herein as the "aqueous inhibited chromic acid solution." It has been found that through the use of this solution, which we operate up to just below its boiling point and preferably at about 200° F., about 35% of the carbon being removed is converted to $CO_2$ gas. Other commercially available solutions for cleaning carbon generally precipitates carbon as a sludge. Preferably this second solution is an aqueous $CrO_3$–$H_3PO_4$ consisting of 22–32% by weight commercial chromic acid flakes, 18–30% by weight of 85% phosphoric acid with the balance water.

The third solution, herein referred to as the "alkaline permanganate aqueous solution" preferably consists of 8–11% by weight sodium carbonate, about 8–11% by weight sodium hydroxide, 4–6% by weight potassium permanganate with the balance water. It is preferred that this alkaline permanganate solution be operated at about 180° F. although it can be operated up to about 190° F. before the permanganate starts to decompose. The objection to operating much below about 170° F. is the excessive time required for the solution to oxidize the materials being removed.

The fourth solution herein referred to as the "mixed inhibited inorganic acids aqueous solution" is the most critical of the solutions regarding time of immersion of an article therein because of the inclusion of strong chemicals. The preferred composition of this solution consists, in percent by weight, of about 33% $HNO_3$ in aqueous solution, about 2% ammonium bifluoride, about 1% acetic acid (99.6%), about 0.05% phosphoric acid (85%) with the balance water. Such a solution is preferably made by adding to water about 48% by weight of 42° Bé. nitric acid and about 7% of a concentrate solution consisting of about 26% by weight ammonium bifluoride, about 14% by weight acetic acid (99.6%), about 0.75% by weight phosphoric acid (85%) with the balance water. The mixed inhibited inorganic acids aqueous solution is used at about room temperature because temperatures much above about 100° F. will tend to drive off the more volatile chemicals. Its composition has been found to be more critical than the other solutions because an unbalance of the acids and inhibitors have been found to cause etching and attack of the metallic articles themselves, particularly the intergranular corrosion type of damage.

When articles to be cleaned do not include aluminum or its alloys, it has been found that a preferred system including sequestered inorganic alkaline aqueous solution, alkaline permanganate aqueous solution and mixed inhibited inorganic acids aqueous will bring about the required conditioning of even the most difficult to clean articles. Therefore, a preferred embodiment of the method of this invention for cleaning all metallic articles excluding aluminum includes the steps of bringing into contact, such as through immersion or spraying, an article with at least two of the three solutions sequestered inorganic alkaline aqueous solution, alkaline permanganate aqueous solution and mixed inhibited inorganic acids aqueous solution as have been described above.

*Example 1*

A magnesium casting comprising in percent by weight 9% Al, 2% Zn with the balance Mg was immersed in a 230° F. sequestered inorganic alkaline aqueous solution comprising, in percent by weight, 30% sodium hydroxide, 5% sodium gluconate, 0.1% sodium carboxymethylcellulose with the balance water. Although 30 minutes is usually adequate to clean magnesium articles with or without a paint coating, it has been found that no harm comes to the material during immersion for much longer periods of time. Upon removal and water rinsing, the magnesium article is clean enough for inspection.

*Example 2*

A low alloy steel article having the composition in percent by weight of 1.8% Ni, 0.8% Cr, 0.25% Mo, 0.4% C with the balance Fe and including on its surface both rust and carbon was immersed in the sequestered inorganic alkaline aqueous solution of Example 1 for about ½ hour. It was then water rinsed and immersed in the preferred inhibited chromic acid solution as described above. After again rinsing in water, the low alloy steel article was ready for inspection. This same procedure has been used for alloy and stainless steels up to the AISI type 400 series.

*Example 3*

By far the most difficult to remove scale and carbon deposits include those found on the higher series of stainless steel such as the AISI 300 series and above or on the super alloys because of their use at higher operating temperatures. A cast article of a super alloy comprising in percent by weight 0.15% C, 19% Cr, 9.75% Mo, 10% Co, 2.5% Ti, 1% Al, 0.006% B with the balance essentially nickel and impurities and having on its surface a deposit of heat scale and carbon was, after first degreasing, immersed in the sequestered inorganic alkaline aqueous solution as described in Example 1 above for 1 hour. It was then water rinsed and immersed in a 180° F. alkaline permanganate aqueous solution comprising, in percent by weight, 10% $Na_2CO_3$, 10% NaOH, 5% $KMnO_4$, with the balance water. After holding in this alkaline permanganate solution for about one hour, the article was then rinsed in water and immersed in the mixed inhibited inorganic acids aqueous solution for about 20 minutes after which it was rinsed in water and further cleaned of loose scale and rinsed such as with a water jet. In some of the most difficult cases, recycling through the inorganic mixed acids solution can be made but immersion in such a solution is limited to about 60 minutes total for the article. In this example the mixed acids solution was made up, in percent by weight, of 48% of 42° Bé. nitric acid solution, 1% acetic acid (99.6%), 0.05% of 85% phosphoric acid, 1.85% ammonium bifluoride with the balance water, and was operated at room temperature.

In the case of scale removal only, without concern for carbon deposits, immersion in the alkaline permanganate aqueous solution can be eliminated. In addition, if the scale or carbon deposits are very light, such high stainless steels or super alloys can, after treatment in the sequestered inorganic alkaline aqueous solution, be treated by the inhibited chromic acid solution described thus eliminating the use of the alkaline permanganate aqueous solution and the mixed inhibited inorganic acids aqueous solution.

In using the above described solutions in both 700 gallon and 1500 gallon tanks, it has been found that, for normal production line use, the tanks need be changed only about twice a year with intermediate additions to overcome "drag out." Although agitation of the solutions is not mandatory, more rapid cleaning and conditioning has been achieved through agitation of the solutions by well known means.

As was stated before, through the use of these four solutions in the practice of the method of this invention, expensive special equipment can be eliminated in the cleaning of a wide variety of types of metallic articles.

Although this invention has been described in connection with specific examples, the modifications and variations of which the present invention is capable will be understood by those skilled in the art.

What is claimed is:

1. In a method for removing normal oxide and carbon from an article made from a metal based on the elements selected from the group consisting of iron, nickel and cobalt, the iron base metal being an austenitic type stainless steel, the steps of: preconditioning the article by contacting the article with a sequestered inorganic alkaline aqueous solution consisting, by weight, essentially of 29–30% sodium hydroxide, 4–5% sodium gluconate, 0.05–0.10% of a compatible suspending agent, with the balance water; rinsing the article; contacting the article with an alkaline permanganate aqueous solution consisting essentially of, by weight, 8–11% sodium carbonate, 8–11% sodium hydroxide, 4–6% potassium permanganate, with the balance essentially water; rinsing the article; and then contacting the article with a mixed inhibited inorganic acid aqueous solution consisting essentially of, by weight, about 33% $HNO_3$ in aqueous solution, about 1% acetic acid, about 0.05% phosphoric acid, about 2% ammonium bifluoride, with the balance water.

2. In a method for removing oxide and carbon from articles made from a metal based on iron and selected from the group of iron alloys consisting of low alloy, alloy and martensitic type stainless steel, the steps of preconditioning the article by contacting the article with a sequestered inorganic aqueous solution consisting, by weight, essentially of 29–30% sodium hydroxide, 4–5% sodium gluconate, 0.05–0.10% of a compatible suspending agent. with the balance water; rinsing the article; and then contacting the article with a solution of an aqueous inhibited chromic acid solution consisting essentially of, by weight, 22–32% $CrO_3$, 18–30% phosphoric acid, with the balance essentially water.

3. In a method for removing oxide and heavy carbon from an article made from a metal based on iron and selected from the group of iron alloys consisting of low alloy, alloy and martensitic type stainless steel, the steps of: preconditioning the article by contacting the article with a sequestered inorganic alkaline aqueous solution consisting, by weight, essentially of 29–30% sodium hydroxide, 4–5% sodium gluconate, 0.05–0.10% of a compatible suspending agent, with the balance water; rinsing the article; contacting the article with an aqueous inhibited chromic acid solution consisting essentially of, by weight, 22–32% $CrO_3$, 18–30% phosphoric acid, with the balance essentially water; rinsing the article; and then contacting the article with an alkaline permanganate aqueous solution consisting essentially of, by weight, 8–11% sodium carbonate, 8–11% sodium hydroxide, 4–6% potassium permanganate, with the balance essentially water.

4. In a method for removing undesirable surface materials from a metal article made from an alloy selected from the group consisting of magnesium, steel, and their combinations, the steps of contacting the article with a sequestered inorganic alkaline aqueous solution consisting essentially of, in percent by weight, 29–30% sodium hydroxide, 4–5% sodium gluconate, 0.05–0.10% of a suspending agent, with the balance water; rinsing the article; and then contacting the article with an alkaline permanganate aqueous solution consisting essentially of, in percent by weight, 8–11% sodium carbonate, 8–11% sodium hydroxide, 4–6% potassium permanganate with the balance water.

5. In a method for conditioning a highly alloyed metal article for the removal of undesirable surface materials, the steps of contacting the article with a sequestered inorganic alkaline aqueous solution consisting essentially of, in percent by weight, 29–30% sodium hydroxide, 4–5% sodium gluconate, 0.05–0.10% of a suspending agent, with the balance water; rinsing the article; contacting the article with an alkaline permanganate aqueous solution consisting essentially of, in percent by weight, 8–11% sodium carbonate, 8–11% sodium hydroxide, 4–6% potassium permanganate, with the balance water; rinsing the article; and then contacting the article with a mixed inhibited inorganic acid aqueous solution consisting essentially of, in percent by weight, about 33% $HNO_3$ in aqueous solution, about 1% acetic acid, about 0.05% phosphoric acid, about 2% ammonium bifluoride, with the balance water.

6. In a method for removing light oxide and light carbon from an article made from a metal based on elements selected from the group consisting of iron, nickel and cobalt, the iron base metal being an austenitic type stainless steel, the steps of: preconditioning the article by contacting the article with a sequestered inorganic alkaline aqueous solution consisting, by weight, essentially of 29–30% sodium hydroxide, 4–5% sodium gluconate, 0.05–0.10% of a compatible suspending agent, with the balance water; rinsing the article; and then contacting the article with a solution of an aqueous inhibited chromic acid solution consisting essentially of, by weight, 22–32% $CrO_3$, 18–30% phosphoric acid, with the balance water.

7. In a method for removing oxide from an article made from a metal based on elements selected from the group consisting of iron, nickel and cobalt, the iron base material being an austenitic type stainless steel; the steps of: preconditioning the article by contacting the article with a sequestered inorganic alkaline aqueous solution consisting, by weight, essentially of 29–30% sodium hydroxide, 4–5% sodium gluconate, 0.05–0.10% of a compatible suspending agent, with the balance water; rinsing the article; and then contacting the article with a solution of mixed inhibited inorganic acids aqueous solution consisting, by weight, essentially of, about 33% $HNO_3$ in aqueous solution, about 1% acetic acid, about 0.05% phosphoric acid, about 2% ammonium bifluoride, with the balance water.

References Cited in the file of this patent

UNITED STATES PATENTS

| | | |
|---|---|---|
| 1,899,734 | Stockton | Feb. 28, 1933 |
| 2,553,937 | Patrie | May 22, 1951 |
| 2,620,265 | Hesch | Dec. 2, 1952 |
| 2,650,156 | Shelton-Jones | Aug. 25, 1953 |
| 2,650,157 | Cochran | Aug. 25, 1953 |
| 2,650,875 | Dvorkovitz et al. | Sept. 1, 1953 |
| 2,673,143 | Du Fresne et al. | Mar. 23, 1954 |
| 2,687,346 | McDonald | Aug. 24, 1954 |
| 2,705,500 | Deer | Apr. 5, 1955 |
| 2,724,667 | MacPherson | Nov. 22, 1955 |
| 2,962,395 | Brown | Nov. 29, 1960 |
| 3,000,829 | Arden | Sept. 19, 1961 |
| 3,010,854 | Satterfield | Nov. 28, 1961 |